(12) United States Patent  (10) Patent No.: US 8,375,420 B2
Farrell et al.  (45) Date of Patent: Feb. 12, 2013

(54) CHALLENGE-RESPONSE SYSTEM AND METHOD

(75) Inventors: Stephen Farrell, Dublin (IE); Bill dehOra, Dublin (IE); Sean Coughlan, Dublin (IE); Hunter Kelly, Blackrock (IE); Jaroslaw Lewandowski, Ballybrack (IE)

(73) Assignee: NewBay Research Limited, Dublin (IE)

( * ) Notice: Subject to any disclaimer, the term of this patent is extended or adjusted under 35 U.S.C. 154(b) by 282 days.

(21) Appl. No.: 12/825,389

(22) Filed: Jun. 29, 2010

(65) Prior Publication Data

US 2011/0004924 A1  Jan. 6, 2011

(30) Foreign Application Priority Data

Jul. 2, 2009  (IE) .................................. S2009/0506

(51) Int. Cl.
*H04L 9/32* (2006.01)
*H04L 9/00* (2006.01)

(52) U.S. Cl. .................................. 726/3; 726/4; 713/168
(58) Field of Classification Search .................. 713/150, 713/155, 168–171, 181; 726/1–7
See application file for complete search history.

(56) References Cited

U.S. PATENT DOCUMENTS 5,313,521 A * 5/1994 Torii et al. ..................... 380/281
6,038,597 A * 3/2000 Van Wyngarden ............ 709/219
6,105,027 A * 8/2000 Schneider et al. .................... 1/1

* cited by examiner

*Primary Examiner* — Hosuk Song
(74) *Attorney, Agent, or Firm* — Porter, Wright, Morris & Arthur, LLP

(57) ABSTRACT

A content-based authorization method is described, wherein the method is operable to validate that a user has access to certain content. By having access to the content, the system is able to decide that the user is authorized to access the content, and may perform operations or set access rights accordingly.

18 Claims, 3 Drawing Sheets

```
U->CS: HTTP GET <<file>>
...authentication and authorization exchanges...
CS->U: 200 OK ...<<initital file bytes...>>...
...assume that U now has bytes 1-1000 of
   a 10,000-byte file...
...connection drops, C establishes contact with HS...
U->HS: HTTP GET <<file>>
       Content-Range: bytes 1000-9999/10000
HS->U: 401 Unauthorized
       WWW-Authenticate: CC: nonce=7893932,br=500..599
U->HS: HTTP GET <<file>>
       Content-Range: bytes 1000-9999/10000
       Authorization: CC: QWRtaW46Zm9vYmFy...W43
HS->U: 200 OK ...<<remaining file bytes>>
```

Fig. 4

CHALLENGE-RESPONSE SYSTEM AND METHOD

FIELD OF THE INVENTION

This invention relates to a challenge-response system and method, in particular a content-based challenge-response system and method.

BACKGROUND OF THE INVENTION

In recent times, there has been an increase in use of massive on-line storage and backup systems, which allow (generally many) users to store files in a service provided on the Internet. An example of such a system is the LifeCache Digital Vault product from NewBay Software Ltd. (www.newbay.com). Such storage system products can improve storage efficiency via so-called "de-duplication." Where many users use such a service for backup purposes there will often be many copies of the same file stored, for example system files or popular music files. De-duplication means having the service only store a single (or few) copies of such files, thus consuming less raw storage. De-duplication is a well-known feature of such storage systems.

As an additional aspect of de-duplication, some storage systems can detect that a user is attempting to upload a file that is a duplicate, and indicate to the user's client software that that upload is unnecessary, since a copy of the file is already present in the overall store. This improves the bandwidth efficiency of the service and the service's responsiveness to the user, since only one full copy of the file needs to be uploaded to the service. For example, Deucour, J. et al, ("Reclaiming space from duplicate files in a serverless distributed file system," 22nd International Conference on Distributed Computing Systems, pp 617-624, July 2002) describes a distributed file system called Farsite that automatically detects duplication, and only stores a single version of a file.

One mechanism that achieves this is to have the user's client software compute a hash of the file content using a cryptographic hash algorithm, such as SHA-256, and for the client software to send the hash value (which is a short, fixed-length value) to the service. The service can then check if any other file with the same hash value is already stored and if so, the upload can be avoided and the service can simply note that that user also has a copy of the file in question. The service will associate various pieces of user meta-data with the stored file, but doesn't require the user to upload the actual file content a second time, nor will the service have to store the file a second time.

However, this creates a security vulnerability—if an attacker can guess a hash value, or if an actual hash value becomes known to the attacker, then the above process would allow the attacker to pretend to upload the file, in which case the service would associate that file content with the attacker, and subsequently allow the attacker to download a copy of the file content. The net effect is that the attacker would have gained access to the file content, thanks to the de-duplication scheme, even though the attacker never actually had a copy of file. The attacker would have essentially stolen the file content.

With the selection of a proper hash algorithm, there is no realistic probability of simply guessing the relevant hash value. However, hash functions that were previously considered cryptographically strong (e.g. MD5) have been broken by cryptanalysis in various ways, so a system using such a weak hash function for de-duplication could be vulnerable to guessed or colliding hash values. Of course, as cryptographic techniques improve over time, what was once considered a secure hash function may become insecure.

Even with what is currently considered a good hash function, such as SHA-256, actual hash values could leak out of the system, either via users colluding with one another, via operator error or operator staff misbehaviour. In that case the attacker does have the correct hash value (but not the file content) and without an appropriate challenge-response scheme the attacker could again steal the file content.

Examples of known challenge-response schemes can be found in the following:

"Network Security—PRIVATE Communication in a PUBLIC World", Second edition, Kaufman, Perlman, Speciner, Prentice Hall, 2002. ISBN-13: 9780130460196

Lee & Yeh, "A Self-Concealing Mechanism for Authentication of Portable Communication Systems" International Journal of Network Security, Vol. 6, No. 3, PP. 285-290, May 2008.

However, the above schemes involve the use of shared-secrets like passwords, or a so-called 'warrant' (which is like a Kerberos ticket-granting-ticket) that is used in order to authenticate the user.

In addition, there is a related problem with efficient file downloads in a more general context. For example, when downloading a file using the HTTP protocol, if the file-content is in any way sensitive, then clients typically have to authenticate and be authorized for access to the file. That process can be relatively resource-intensive in large-scale applications. In cases where the subsequent download operation is interrupted, the HTTP protocol supports the client requesting that the download be resumed at the relevant point (more generally the client can request that only certain byte-ranges be downloaded), but such requests generally have to incur all the authentication and authorization overhead of the initial request, which imposes a burden on large scale Internet services. For example, this can prevent making best use of load-balancing techniques or content delivery networks.

As a result, it is an object of the invention to provide a validation scheme which validates that a user actually has a copy of the file content during the upload process, while still gaining the benefits of the de-duplication scheme. It is a further object of the invention to provide a scheme for block-level resume operations with less overhead than applying full authentication and authorisation.

SUMMARY OF THE INVENTION

Accordingly, there is provided a content-based authorisation method operable in a server for authorising an operation requested by a client across a communications network, the method comprising the steps of:

receiving a request from the client to perform an operation in respect of a data item;

generating a challenge based at least on the content of said data item, wherein said challenge comprises a request for an indication that the client has access to at least a first part of said content;

sending said challenge to said client;

responsive to receiving a response to said challenge from said client comprising said indication, authorising said operation.

As the client is able to demonstrate that they are in possession of the requested part of the data item, it can be assumed that the client is either in possession of at least a first portion of entire data item, or that the client has been authorised to possess the data item. This allows the server to safely authorise the action requested by the client.

Preferably, the method comprises the step of generating a nonce value, and wherein said step of generating a challenge comprises including in said challenge said nonce, and wherein said authorising step is responsive to said received indication being based on a combination of said nonce and said first part of said content to authorise said operation.

Preferably, at least a portion of said response received from said client and including said indication is cryptographically processed.

Preferably, said cryptographically processed portion is based at least in part on said nonce.

The response may comprise the hash value of the portion of the data item. For example, the hash function SHA-256 may be applied to some combination of a nonce and a byte range.

In addition or alternatively, the method comprises the step of performing a secure cryptographic key exchange operation.

Some challenge-response schemes might not require the generation of an explicit nonce, for example, schemes based on strong password protocols, like Encrypted Key Exchange (EKE). In these cases, the shared secret between the parties (i.e. between the client and the server) is the at least a first part of the content, and the private values can be randomly generated and hence provide the anti-replay function of the nonce, e.g. Diffie-Hellman EKE.

Preferably, the method comprises the step of obtaining a server public value based on said at least first part of said content and a server private value, and wherein said step of generating a challenge comprises providing with said challenge said server public value and an indication of said at least first part of said content, and wherein said authorising step is further responsive to said response being based at least in part on said server public value.

The use of a server private value, which may be randomly generated, introduces a random element to the validation process, and can bypass the need for a nonce value.

Preferably, said step of obtaining a server public value comprises generating a server public Diffie-Hellman value.

Preferably, said authorising step is further responsive to said response being based on a client public value, wherein said client public value is based on said at least first part of said content.

Preferably, said authorising step is responsive to said response being based at least in part on a client public Diffie-Hellman value.

Preferably, said step of authorising is responsive to said response being based on said client public Diffie-Hellman value and an authenticator based on said server public Diffie-Hellman value, said at least first part of said content, and a client private Diffie-Hellman value.

Preferably, the method further comprises the step of: generating an authenticator value using a secret key, wherein the step of generating a challenge comprises embedding said authenticator value in said challenge, and wherein said step of authorising is responsive to said received response comprising an indicator of said authenticator value to authorise said operation.

Preferably, the method further comprises the step of selecting said at least first part of said content.

It will be understood that the indication may refer to any characteristic portion of the data item in question, e.g. a specified byte range; a portion of text in a document; a value at a point on a graph; etc.

Preferably, one of said client or said server selects said indication of said at least first part of said content.

Further preferably, said response includes said selection in addition to said indication.

It will be understood that this allows for the situation wherein the client (not the server) selects said at least first part of said content to be used in the authorising step. It also allows for the situation when the server selects the content to be used in the authorising step, but the client re-informs the server of the indication or potentially adjusts the indication used, so allowing the overall system to be less stateful, as the server does not necessarily have to keep a record of the indication required of the client.

In instances where the client only has possession of the first portion of the data item, and perhaps wishes to get access to the remainder of the data item, the challenge-response is based on the content of that portion of the data item that the client already possesses. If the client has previously been authorised to possess the first portion, then the server can assume that they are authorised to possess the remainder of the data item.

In instances where a client has possession of the entire data item, and is requesting a server operation based on the data item, the server can issue the challenge-response based on any portion of the data item. This may occur in for example an on-line storage system, where the server wishes to check if the client is correctly in possession of the data item in question.

There is further provided a content-based authorisation method for a hand-off operation between a central content server and a hand-off server across a communications network, the method comprising the steps of at the central content server:

receiving a request from a client to download a data item from the central content server;
performing an authorisation operation with said client;
responsive to said authorisation operation, sending at least a first portion of said data item to said client; and
altering the communications connection between said central content server and said client to cause said client to connect with the hand-off server once said at least first portion of said data item has been sent to said client, and wherein the method further comprises the steps of, at the hand-off server:
receiving a request from said client to download at least a second portion said data item; and
authorising said download operation by said client according to the first aspect of the invention.

This approach allows for a streamlined hand-off procedure between a central server and a separate hand-off server. In this case, the central server is tasked with the initial authorisation procedure (which may be relatively resource-intensive), and transmitting a first portion of the data item. The hand-off server does not have to provide an intensive authorisation mechanism, but simply checks if the client has received a first portion of the data item in question. If the client can prove this, then the hand-off server can assume that the client has already passed the intensive authorisation of the central server, and allows the further download of the data item from the hand-off server. This allows the authorisation procedure to be centralised in the central server, while the bulk of the download operations can be performed at distributed hand-off servers.

Preferably, said step of altering comprises breaking the communications connection between said central content server and said client once said at least first portion of said data item has been sent to said client.

Additionally or alternatively, said step of altering comprises redirecting said client to said hand-off server.

Preferably, said step of redirecting comprises sending to said client a partial content response. An example of such a partial content response would be an HTTP response with response code 206.

DETAILED DESCRIPTION OF THE INVENTION

Embodiments of the invention will now be described, by way of example only, with reference to the accompanying drawings, in which:

FIG. 4 is a sample illustration of the method of the invention for the system of FIG. 3.

Figure 1:
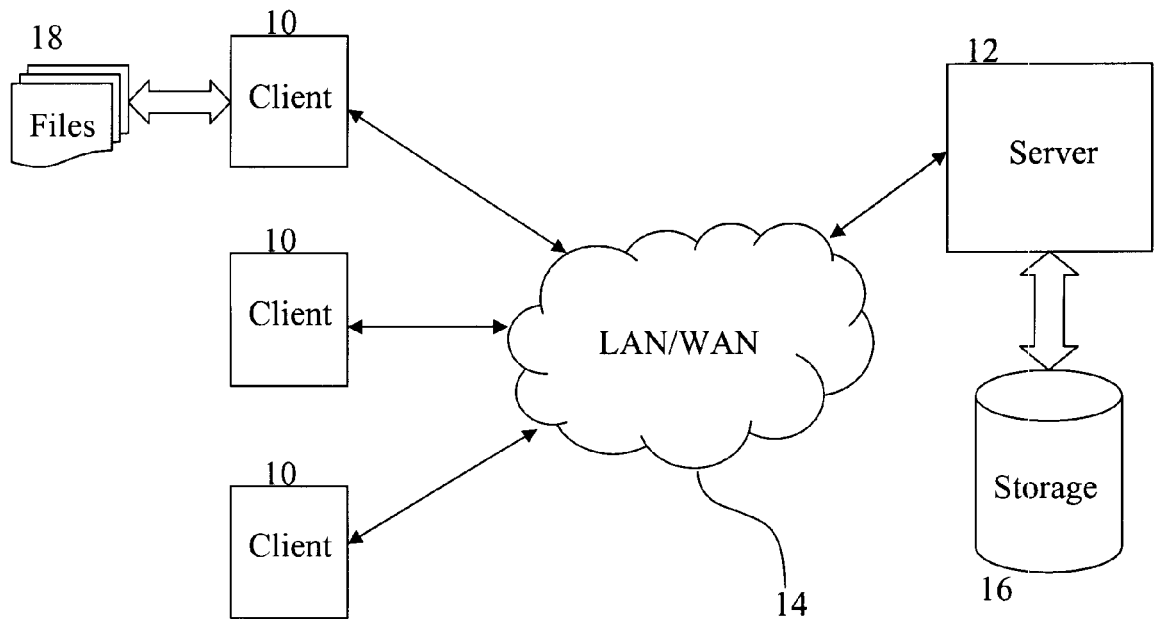
FIG. 1 is an illustration of an on-line storage and backup system.

For both the storage system use case and the HTTP use case described above, the service has full knowledge of the content, and the user has, or only wants to demonstrate, partial knowledge. In the storage system use case, the user knows the hash-value of the overall content, and the aim is for the user to prove that they (almost certainly) actually have the full content. In the HTTP use case, the user has the partially downloaded file and the goal is to authorise access to the remainder of the file by demonstrating that the user (almost certainly) actually has previously accessed the partial content (and hence has been authorised for access to the full content).

A challenge-response protocol is used to require the user to demonstrate that they possess the relevant partial or full content, and uses that result to then authorise the association in the storage system use case and the remaining or continued download in the HTTP use case. In contrast to known challenge-response schemes where the shared secret must be managed via some out-of-band process, in this case, the partial content that the user claims to possess is used as the shared secret in the challenge-response system of the invention.

Many challenge-response protocols could be used in order to achieve the required demonstration, for example the most basic approach would be for the service to require the user to actually upload the (partial or full) file content. However, that would clearly not achieve the efficiency required.

As a next step one could challenge the user to upload a randomly selected range of bytes of file content which does provide evidence that the user actually has the content in question. In the storage system use case that randomly selected byte-range can be from anywhere in the file; in the HTTP use case, the byte-range has to be from the portion of the file that the user has previously acquired.

However, that variant requires that the user upload variable sized parts of the claimed content, which is undesirable for both bandwidth consumption reasons and because it could unnecessarily expose file content in some cases. In addition, that variant is also vulnerable to replay attacks if the service selects the same or overlapping ranges, which is quite likely to occur with smaller files. (In such a case, an eavesdropper would see the relevant bytes of the file and could then answer challenges.)

In order to avoid these pitfalls, the service can include a random number (referred to as a "nonce") in the challenge along with a specifier of the required byte-range, and require that the correct response be based on the nonce and the use of a hash function applied to the relevant byte range. One possible combination is to use a hash function "H( )" (like SHA-256) and for the response to the challenge to be H(nonce||H(byte-range)) where the "||" operator represents catenation.

That response method provides "freshness" since the service can choose a different nonce each time, (or periodically), and the service can impose a time-window on the use of particular nonce-values, either on a per-user or other basis. In addition this response format doesn't allow an eavesdropper to produce its own responses unless the eavesdropper does know the file content for the byte-range in question, thanks to the one-way nature of the hash function. This particular challenge-response scheme also has the benefit that the service doesn't need to identify the requesting user at this point in the process—all that is required is that the user be able to answer the relevant challenges.

The size of the byte-range(s) requested and the number of iterations of the challenge/response cycle are configurable parameters of the scheme, where larger ranges and more iterations increase the service's confidence that the user actually is in possession of the claimed content.

Variations of the content-based challenge-response scheme can also work where the two parties negotiate the byte-ranges to use as the shared secret. For example, in some applications it may be sufficient if the prover (the user) selects the byte-ranges to use. In other variations the byte-ranges could be negotiated via one or more exchanges. For example, a scheme where the service supplies a nonce as a challenge and the user side responds with H(nonce||H(byte-range))|| byte-range could be used.

In all of the above, the term "byte-range" can refer to contiguous or non-contiguous ranges of bytes, specified via offsets or via some other method. An example of the latter where the content is structured as XML [XML] could be an XPath [XPATH] expression or other well-known methods of selecting partial content. If the prover and verifier were dealing with content stored in a relational database, then the byte-range could consist of the result upon execution of an SQL expression.

The byte-range specifier could also be obfuscated, so that simply examining the challenge (or response) without knowledge of the file content does not immediately expose the actual byte-range. So, a challenge could specify a byte-range in terms of another byte-range, for example, "use the value of bytes 1000-1001 as the start of the range, and the value of byte 900-901 as the end of the range." Such obfuscated byte-range specifiers make it harder for an eavesdropper that has different partial information to produce the correct response (or to verify the response, if the prover selects the byte-range).

In the above description, the nonce and byte-range are shown as being present in the challenge but not in the response. A variation of the scheme that allows the server to be less stateful would also include these values in the response. In that way the server need not store the nonce and byte-range selected for each transaction but can still verify the challenge-response. However, if a protocol making use of this scheme does allow the nonce and byte-range to be part of the response value, then there is a requirement that the server be able to verify that those values were selected by it, and not simply chosen by the client. There are many ways to achieve this result, for example, the server could store a secret key known only to it and embed an authenticator generated with that key, within or alongside the nonce value that authenticates both the nonce and the byte-range. Alternatively the server could use that key to securely wrap the challenge, and the wrapped challenge could then be used by the client as the nonce. Such embedding can make use of message authentication codes or encryption schemes.

Many other cryptographic challenge-response schemes could be used based upon the idea of the content based challenges presented, for example, strong password protocols like Encrypted Key Exchange (EKE). In general, such key exchange systems allow two parties that have no prior knowledge of each other to jointly establish a shared secret key over an insecure communications channel. The two parties may both possess a cryptographically weak secret (e.g. a simple password), but the secret is never openly transmitted during the operation.

When combined with the present system, such schemes would allow the peers to validate that they both possess the full or partial file content. In this case, the full or partial file content (in most embodiments, specifically, the portion or byte-range chosen of the file content) takes the place of the shared secret in such a scheme. It is then possible to work backwards from the shared secret and the private value chosen (i.e. the random element) to generate appropriate public values for transmission as part of the validation process.

Combining the content-challenge scheme with strong password protocols would typically involve sending the byte-range specifier together with the validator's public value, with the response being the prover's public value, which is based on a combination of the validator's public value, the prover's private value, and the shared secret (i.e. the partial content matching the byte-range specifier). Due to the nature of schemes like EKE, there would be no need for a separate nonce value, as the public values already involve random inputs.

Some challenge-response schemes might not require the generation of an explicit nonce, as the private values can be randomly generated and hence provide the anti-replay function of the nonce, e.g. Diffie-Hellman EKE.

For the HTTP use-case the system presented supports a new way for a service to hand-off the bandwidth requirements for bulk downloads, while still preserving some security. For example, the service could do the appropriate (and resource intensive) authentication and authorization of the user's initial request, then transfer a (sufficiently large) portion of the file before deliberately breaking the connection. The user's client can then attempt to re-connect to download the remaining bytes of the file, but that second HTTP request can now safely be handed off to another server or service that can use this content-based challenge response scheme instead of traditional, and more expensive, authentication and authorisation.

In addition to the efficiency considerations, the system does not require that the service to which the user is offloaded even be able to authenticate or authorize the user, which means that that service need not manage user credentials or access control lists, which represents a significant security advantage and simplification.

Most challenge/response schemes also allow the user and service to derive a shared secret that can be used to secure further exchanges between them. For example, in the scheme where the challenge is a nonce and a byte-range and the response is $H(nonce\|H(byte\text{-}range))$ the user and service could also derive a secret from the nonce and the byte-range in various ways, for example using some key derivation function (KDF) (such as those specified in Chen, L., "Recommendations for Key Derivation Using Pseudorandom Functions", NIST Special Publication 800-108, April 2008), using the nonce, the byte-range and some fixed value as input. While that secret is essentially only as strong as the unpredictability of the byte-range, it may nevertheless be useful as an application layer key, and could, for example, be used to encrypt the remaining content (at the application layer) in the HTTP and storage system use cases.

The overall security of the system presented will depend on the predictability of the content in question. If a dishonest user on the Internet can predict the value (or is attempting to confirm a prediction), then the system doesn't add real security value, since it would allow the user to produce the proper responses.

For the storage system use-case this is not a very serious threat, since all that the dishonest user gains is the knowledge that someone else has uploaded that file content at some point. The dishonest user can already do that via monitoring the handling of full uploads in any case.

For the HTTP use case the threat is more serious, since it would allow users with partial information, e.g. anyone who can predict the bytes at the start of the file, to gain access to the rest of the file. However, there are many applications where the native file content is sufficiently unpredictable, or where the service provider can modify the initial bytes of the file content to make it unpredictable (e.g. via recoding), so that the scheme is still worthwhile. The main benefit of the scheme in such cases is that the initial computationally intensive authentication and authorisation required for the initial request are not required for subsequent partial downloads. In cases where the initial HTTP request is authenticated and authorised, so long as the initial HTTP response contains a sufficiently large number of unpredictable bytes, then the scheme offers security benefits.

In the HTTP use case, users could collude so that once one has downloaded partial content, that user could share that content with other users, who could then use the service to gain access to the full content. However, this is not significantly different from the dishonest user sharing their password or other credentials, nor from cases where one user downloads the entire file and shares that content, for example, via some peer-to-peer network, which is presently a relatively common occurrence. The only difference is that, with this scheme, the colluding users require less bandwidth but they still all get access to the content, as before.

In the HTTP use case, if the handoff described above is used, and if the file content is not considered sufficiently unpredictable, or if there is a concern that the file content may become too widely known over time, then it is possible with many file formats, to embed random values near the start of the file. If the service were to occasionally change those random values, then simply distributing those values to the handoff-servers would suffice to increase the level of security, so long as the changed bytes are sufficiently likely to be selected to be part of the byte-range used in the challenge. Were the byte-range specified in more complex ways, e.g. via XPath as previously described, then the modification can be made to essentially arbitrary parts of the file.

In the storage system use case, without the content-challenge scheme, users could access other users' files if they knew the SHA-256 hash of file contents due to the optimisation when uploading files. A sample storage system is illustrated in FIG. 1 the system comprises a plurality of clients 10 connected with a central server 12 via network 14. The central server 12 is coupled with a centralised storage apparatus 16, where single copies of files can be stored, and are accessible across the entire network 14. Each client 10 may have a plurality of files 18 which it is desired to upload to the central server 12 and storage apparatus 16 for archiving and later access.

For the case where the files are already present in the overall store, without the content-challenge, the upload process would be:

1. Client 10 specifies a list of hashes of files 18 which user wants to upload.
2. Server 12 returns all the hashes that are not already contained in the storage vault 18.

3. Client 10 sends the hashes that the server 12 already has, and asks for them to be linked into the user's part of the overall store.

This avoids duplicate uploads, assuming the user really has the file. However, as described above, this system is vulnerable to attacks, if the attacker has knowledge of the hash value for the files in question.

Figure 2:
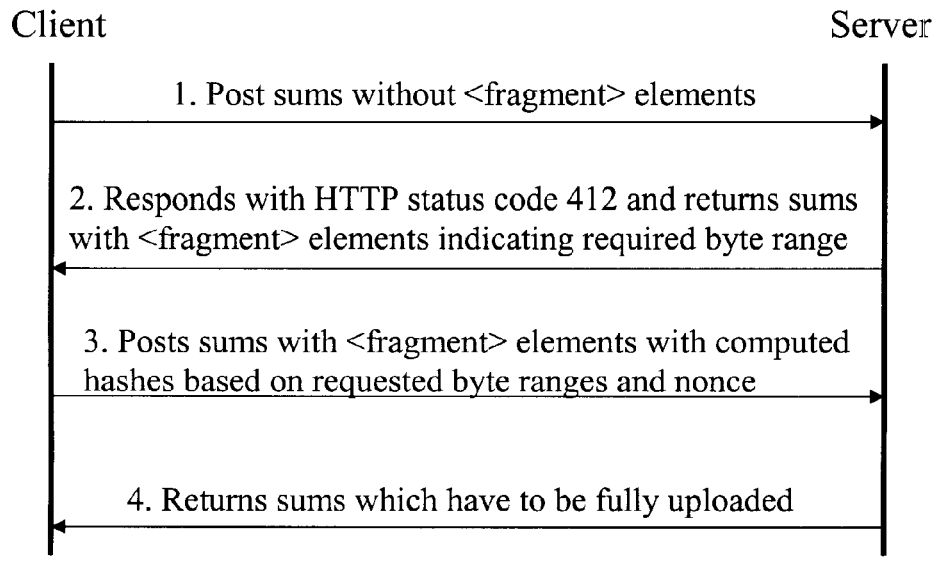
FIG. 2 is a sample illustration of the method of the invention for the system of FIG. 1.

An embodiment of the content-based challenge response system is now described with reference to the storage system use case. With reference to FIG. 2, using the content-challenge scheme of the present system, the above protocol is modified as follows:

1. Client 10 specifies a list of hashes of files 18 (or 'sums') which the user wants to upload.
2. Server 12 issues the content challenge for each file 18 the client 10 wants to upload. The challenge comprises the nonce generated by the server 12 and at least one randomly chosen byte-range specifier (the "<fragment>" element). If the client 10 wishes to upload a number of files, the challenge may also dictate which files are being challenged, by returning the sum value in respect of these files.
3. Client 10 responds with the required challenge-response, i.e. a hash based on the nonce and the relevant bytes from the file 18. Again, if there are several files 18 queried, the responses may be distinguished by incorporating the sums of the original files 18.
4. The server can then compare the received response(s) with the data contained in the storage apparatus 16. Server 12 then returns all the hashes of files that are not already stored at the storage server 16, including any hashes for files 18 where the challenge-response was invalid.

Client 10 may then proceed to upload those files 18 which are not already stored at the storage server 16. The central server 12 is then operable to associate the client 10 with the newly-uploaded files 18, as well as with any files already stored at the storage server 16 which the client 10 has proven that it already possesses.

The storage system use case uses the HTTP protocol as its underlying transport, but, in contrast to the HTTP use case, does not require any changes to HTTP. For the storage system use case, the content-challenge scheme occurs within the payload of the HTTP protocol.

In relation to the HTTP use case, there are many equivalent ways to use the scheme for HTTP, whether based on changes at the application layer, or on the use of different HTTP or other protocol headers.

Figure 3:
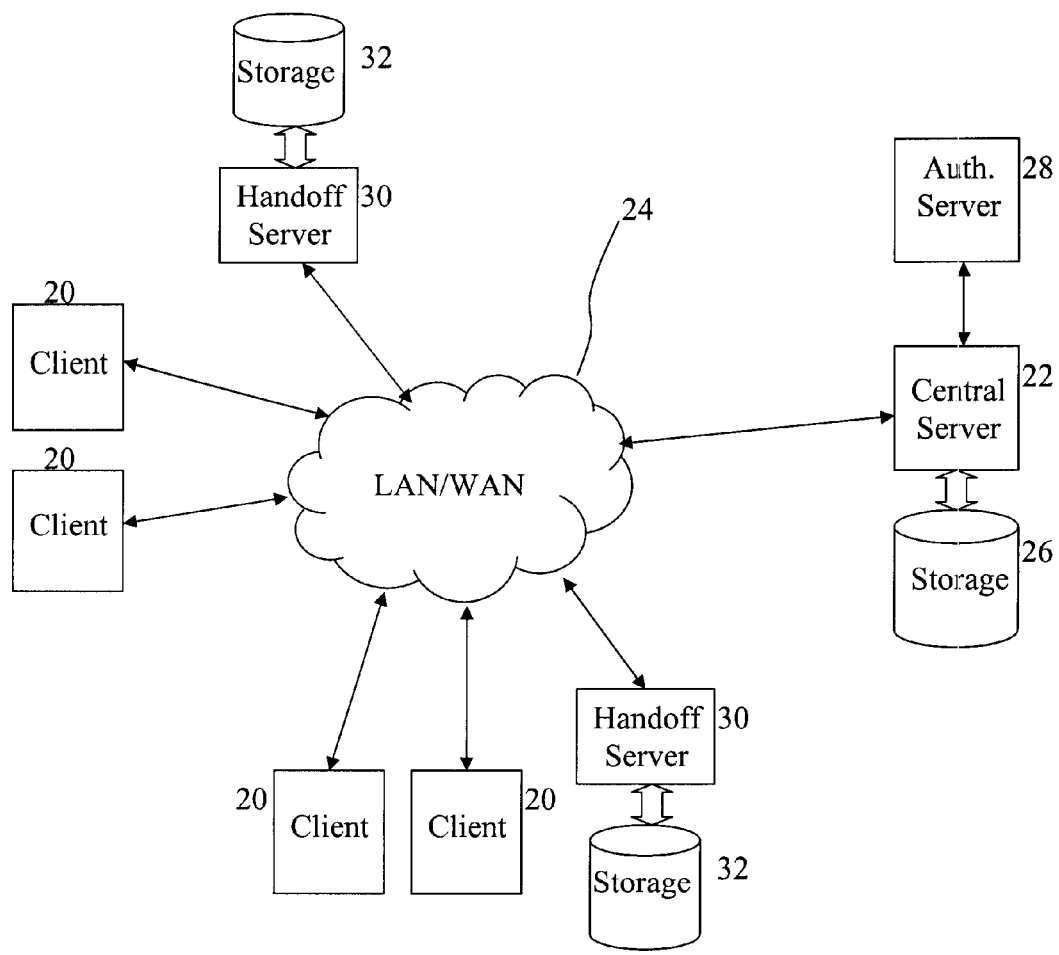
FIG. 3 is an illustration of an on-line distributed content download system.

With reference to FIG. 3, in the HTTP use case, a plurality of clients 20 are connected to the network 24. The clients 10 (or users, "U") are coupled, via network 24, with a central content server 22. The central content server 22 is coupled with storage means 26, and an authentication server 28. On requesting content from the central content server 22, the user U initially performs the (relatively expensive) authentication and authorisation with the content server 22 ("CS") and the authentication server 28.

Once the authentication and authorisation stage is complete, the user U can be sent the initial bytes of the file via the network 24. (It will be understood that the initial user request for the file may be combined with the authentication and authorisation process in any appropriate manner.) After the initial bytes of the file have been sent to the user U, then the content server CS can break the connection. In the example shown in FIG. 4, it is assumed that the user has received bytes 1-1,000 of a 10,000-byte file.

At this point the user's client software (a browser or other HTTP client application) can issue another request for the remainder of the file, or even for the entire file, using standard HTTP mechanisms. Various well-known load-balancing schemes, e.g. presenting different address ("A") resource records in the domain name system (DNS), can be used to process this as a secondary request and can select a hand-off server 30 ("HS") that also has a copy of the entire file stored locally in storage means 32. The hand-off servers 30 and storage means 32 may be distributed about the network 24, perhaps local to a particular group of clients 20.

The hand-off server HS can be configured to require the use of the content-based challenge scheme described here before providing the file content in response to the user U's request. This can easily be done by having the hand-off server HS respond to the user U's request with an HTTP "Unauthorized" error code (normally using the HTTP status code "401"), and issuing the challenge to the user U using the existing HTTP header field called "WWW-Authenticate" with a new authentication scheme, here called "CC" for content-challenge. The parameters of the CC scheme can include the nonce and byte-range specifiers. It may be understood by the HS that the CS will break off the connection to the user U after a pre-determined number of bytes, in which case the HS will know within what limits of the byte range the HS can issue a challenge on. Alternatively, there may be an additional step wherein the HS may enquire of the user U what range of bytes it possesses, and issue the challenge based on some byte-range within this region, or the HS may communicate with the central server in order to determine the range of bytes that were already sent to the user U.

At that point, the user U's client software can respond with a repeat of the HTTP request (for the file content) but can now include the response to the challenge in the existing HTTP header "Authorization" header field with the value being the challenge-response. Once the hand-off server HS has successfully validated the response to the challenge then the HTTP response can include the actual bytes of the file, as requested by the user U.

An example of a sample interchange in the HTTP use case for the above example is shown in FIG. 4 (other HTTP header fields present are not shown).

As described above, for this HTTP use-case the system presented provides an efficient mechanism for handing-off the bandwidth requirements for bulk downloads, while efficiently employing comprehensive authorisation and security protocols.

As examples of the item data that may be referenced, the term 'byte range' can refer to an exact range of bytes in the item byte stream, or can refer to any other characteristic of the file in question, e.g. the number of times the letter 'e' occurs in a text document.

While a storage system use case and a HTTP use case are described above, it will be understood that the system of the invention may be implemented for any suitable data transfer protocol, e.g. SIP.

The system of the present invention leverages the partial content of an item (via the challenge response scheme) in order to authorize access to the full content. Accordingly, the system requires much less overhead than other schemes to achieve the same effect, albeit that this scheme is dependent on the un-predictability of the content.

The storage system use case mitigates a vulnerability that could otherwise be costly were hash-values to leak out, and were a dishonest user to get access to someone else's files. That could have significant reputation cost to the service based on the storage system.

The HTTP use case provides a less onerous "middle-ground" way to secure access to file content in the face of either network failures or, alternatively, offloading schemes.

The challenge-response scheme presented mitigates the problems outlined above, since for example the scheme would require that a hash function collision be generated in real time, and for a value that is unpredictable for the attacker, which is sufficient in many cases to make the attacker's job infeasible, even with a weakened hash function.

While the above description of a HTTP use case refers to file downloading, the HTTP protocol also supports file uploading (e.g. via the HTTP PUT or POST methods), and in some situations the same authentication and authorization overhead can be problematic. In the above embodiment, the details of the HTTP use case for the download situation are described, but the same problem, and the same solution, can also apply to the upload case. Similarly, the HTTP use case could involve many different servers each serving parts of the file content, while the above embodiment describes a case with an initial HTTP server and a secondary server that uses the challenge-response scheme.

It will be understood that the system may be employed in any suitable client-server type interaction, e.g. a peer-to-peer network.

The invention is not limited to the embodiments described herein but can be amended or modified without departing from the scope of the present invention.

The invention claimed is:

1. A content-based authorisation method operable in a server for authorising an operation requested by a client across a communications network, the method comprising a processor performing the steps of:
    receiving a request from the client to perform an operation in respect of a data item;
    generating a challenge based at least on the content of said data item, wherein said challenge comprises a request for an indication that the client has access to at least a first part of said content, said generating including obtaining a server public value based on said at least first part of said content and a server private value;
    sending said challenge to said client including providing with said challenge, said server public value and an indication of said at least first part of said content; and
    responsive to receiving a response to said challenge from said client based at least in part on said server public value and comprising said indication, authorising said operation.

2. The method of claim 1, wherein the method comprises the step of generating a nonce value, and wherein said step of generating a challenge comprises including in said challenge said nonce, and wherein said authorising step is responsive to said received indication being based on a combination of said nonce and said first part of said content to authorise said operation.

3. The method of claim 1, wherein the method further comprises the step of selecting said at least first part of said content.

4. The method of claim 3, wherein one of said client or said server selects said indication of said at least first part of said content.

5. The method of claim 4, wherein said response includes said selection in addition to said indication.

6. The method of claim 1, wherein at least a portion of said response received from said client and including said indication is cryptographically processed.

7. The method of claim 6, wherein said cryptographically processed portion is based at least in part on said nonce.

8. The method of claim 6, wherein the response comprises the hash value of the portion of the data item.

9. The method of claim 6 further comprising the step of performing a secure cryptographic key exchange operation.

10. The method of claim 1, wherein said step of obtaining a server public value comprises generating a server public Diffie-Hellman value.

11. The method of claim 10, wherein said authorising step is further responsive to said response being based on a client public value, wherein said client public value is based on said at least first part of said content.

12. The method of claim 11 wherein said authorising step is responsive to said response being based at least in part on a client public Diffie-Hellman value.

13. The method of claim 12, wherein said step of authorising is responsive to said response being based on said client public Diffie-Hellman value and an authenticator based on said server public Diffie-Hellman value, said at least first part of said content, and a client private Diffie-Hellman value.

14. The method of claim 13 further comprising the step of: generating an authenticator value using a secret key, wherein the step of generating a challenge comprises embedding said authenticator value in said challenge, and wherein said step of authorising is responsive to said received response comprising an indicator of said authenticator value to authorise said operation.

15. A content-based authorisation method for a hand-off operation between a central content server and a hand-off server across a communications network, the method comprising the steps of, a processor at the central content server:
    receiving a request from a client to download a data item from the central content server;
    performing an authorisation operation with said client;
    responsive to said authorisation operation, sending at least a first portion of said data item to said client; and
    altering the communications connection between said central content server and said client to cause said client to connect with the hand-off server once said at least first portion of said data item has been sent to said client, and wherein the method further comprises the steps of, a processor at the hand-off server:
    receiving a request from said client to download at least a second portion said data item; and
    authorising said download operation by said client including:
        generating a challenge based at least on the content of said data item, wherein said challenge comprises a request for an indication that the client has access to at least a first part of said content;
        sending said challenge to said client; and
        responsive to receiving a response to said challenge from said client comprising said indication, authorising said operation.

16. The method of claim 15 wherein said step of altering comprises breaking the communications connection between said central content server and said client once said at least first portion of said data item has been sent to said client.

17. The method of claim 15, wherein said step of altering comprises redirecting said client to said hand-off server.

18. The method of claim 15, wherein said step of redirecting comprises sending to said client a partial content response.

* * * * *